(12) United States Patent
Morimura

(10) Patent No.: US 10,654,140 B2
(45) Date of Patent: May 19, 2020

(54) MACHINE TOOL

(71) Applicant: OKUMA Corporation, Niwa-gun, Aichi (JP)

(72) Inventor: Shoichi Morimura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 15/593,990

(22) Filed: May 12, 2017

(65) Prior Publication Data

US 2017/0329316 A1 Nov. 16, 2017

(30) Foreign Application Priority Data

May 16, 2016 (JP) .................................. 2016-098071

(51) Int. Cl.
*B23Q 7/04* (2006.01)
*B23Q 39/02* (2006.01)
(Continued)

(52) U.S. Cl.
CPC .............. *B23Q 7/046* (2013.01); *B23B 3/065* (2013.01); *B23P 23/02* (2013.01); *B23Q 7/04* (2013.01); *B23Q 7/048* (2013.01); *B23Q 39/025* (2013.01); *B25J 11/005* (2013.01); *B25J 15/0019* (2013.01); *B25J 15/0028* (2013.01); *B25J 15/0066* (2013.01); *G05B 19/402* (2013.01); *B23K 26/0093* (2013.01); *B23P 23/04* (2013.01); *B23Q 3/155* (2013.01); *B23Q 11/005* (2013.01); *B23Q 11/0891* (2013.01); *B23Q 11/10* (2013.01); *B23Q 17/00* (2013.01);
(Continued)

(58) Field of Classification Search
CPC .............. B25J 15/0066; B25J 15/0057; B23Q 3/15534; B23Q 7/045; B23Q 7/048; Y10T 483/16
USPC .......................................................... 483/14
See application file for complete search history.

(56) References Cited

U.S. PATENT DOCUMENTS 3,259,958 A * 7/1966 Lemelson ............ B23Q 1/0009
 408/3
4,590,578 A * 5/1986 Barto, Jr. ................. B21J 15/10
 318/632
(Continued)

FOREIGN PATENT DOCUMENTS

CN 1803437 A 7/2006
CN 102196776 A 9/2011
(Continued)

OTHER PUBLICATIONS

Machine Translation of DE 202012010050, which DE '050 was published Jan. 2013.*
(Continued)

*Primary Examiner* — Erica E Cadugan
(74) *Attorney, Agent, or Firm* — Cantor Colburn LLP

(57) ABSTRACT

A machine tool is provided which can execute various works while suppressing increase in cost or size. The machine tool includes a tool spindle device which is a movable member which can move with respect to a mounting surface of the machine tool, and one or more serial-manipulator-type robots attached on the tool spindle device, which can move with the tool spindle device, and which have two or more degrees of freedom, and the robot includes two or more end effectors provided at positions different from each other with one or more joints therebetween.

5 Claims, 6 Drawing Sheets

(51) Int. Cl.
*B23Q 11/08* (2006.01)
*B23P 23/02* (2006.01)
*B23B 3/06* (2006.01)
*B25J 11/00* (2006.01)
*B25J 15/00* (2006.01)
*G05B 19/402* (2006.01)
*B23B 11/00* (2006.01)
*B23Q 11/10* (2006.01)
*B23Q 17/00* (2006.01)
*B23Q 3/155* (2006.01)
*B23Q 3/157* (2006.01)
*B23K 26/00* (2014.01)
*B26F 1/26* (2006.01)
*B23P 23/04* (2006.01)
*B23Q 39/00* (2006.01)
*B23Q 11/00* (2006.01)
*B23Q 17/24* (2006.01)
*B26F 3/00* (2006.01)
*B33Y 30/00* (2015.01)

(52) U.S. Cl.
CPC .... *B23Q 17/2409* (2013.01); *B23Q 2039/004* (2013.01); *B23Q 2039/008* (2013.01); *B26F 1/26* (2013.01); *B26F 3/004* (2013.01); *B33Y 30/00* (2014.12); *G05B 2219/45061* (2013.01); *G05B 2219/45063* (2013.01); *Y10S 901/39* (2013.01); *Y10S 901/41* (2013.01); *Y10S 901/47* (2013.01); *Y10T 29/5114* (2015.01); *Y10T 483/16* (2015.01)

(56) References Cited

U.S. PATENT DOCUMENTS

| | | | | |
|---|---|---|---|---|
| 4,706,371 A | * | 11/1987 | McMurtry | B23Q 3/15706 483/14 |
| 4,741,078 A | * | 5/1988 | Kimura | B23B 39/205 29/39 |
| 4,947,538 A | * | 8/1990 | McMurtry | B23Q 3/15706 483/14 |
| 5,298,844 A | * | 3/1994 | Nagasaki | B23Q 1/4857 29/26 A |
| 5,309,368 A | * | 5/1994 | Chern | B23Q 3/1576 483/14 |
| 5,458,443 A | * | 10/1995 | Belge | B21J 15/10 408/129 |
| 6,049,580 A | * | 4/2000 | Bodin | B24C 1/045 376/248 |
| 6,416,450 B2 | * | 7/2002 | Susnjara | B23Q 3/15526 294/110.1 |
| 9,492,235 B2 | | 11/2016 | Hourtash et al. | |
| 2002/0124700 A1 | * | 9/2002 | Aulson | B24C 1/045 83/53 |
| 2006/0182608 A1 | | 8/2006 | Kinoshita et al. | |
| 2010/0028117 A1 | | 2/2010 | Nihei et al. | |
| 2010/0061830 A1 | | 3/2010 | Kitayama | |
| 2010/0069920 A1 | | 3/2010 | Naylor et al. | |
| 2011/0015049 A1 | * | 1/2011 | Grob | B23Q 3/1554 483/37 |
| 2015/0063936 A1 | * | 3/2015 | Azzarello | B25J 11/005 409/132 |
| 2018/0126567 A1 | * | 5/2018 | Morimura | B08B 3/02 |
| 2018/0250809 A1 | * | 9/2018 | Morimura | B25J 9/0009 |

FOREIGN PATENT DOCUMENTS

| | | |
|---|---|---|
| CN | 203765048 U | 8/2014 |
| CN | 104334110 A | 2/2015 |
| CN | 204975353 U | 1/2016 |
| DE | 19510498 A1 * | 9/1996 |
| DE | 102006007171 A1 * | 8/2007 |
| DE | 202012010050 U1 * | 1/2013 |
| FR | 2875165 A1 * | 3/2006 |
| JP | H05301141 A | 11/1993 |
| JP | H05301142 A | 11/1993 |
| JP | 07-124848 A * | 5/1995 |
| JP | 2001322049 A | 11/2001 |
| JP | 2003225876 A | 8/2003 |
| JP | 2006-326768 A * | 12/2006 |
| JP | 2010036285 A | 2/2010 |
| JP | 2010064158 A | 3/2010 |
| JP | 2014054705 A | 3/2014 |

OTHER PUBLICATIONS

Machine Translation JP 2006-326768 A, which JP '768 was published Dec. 2006.*
Merriam-Webster's Collegiate Dictionary, 10th ed., copyright 1998, p. 1013, definition of "robot".*
TIPO Taiwan Office Action corresponding to Application No. 106115551; dated Mar. 6, 2019.
JPO Notice of Grounds for Rejection corresponding to Application No. 2016-098071; dated Oct. 29, 2019.
CN First Office Action corresponding to Application No. 201710340219X; dated Nov. 14, 2019.

* cited by examiner

FIG. 6 one or more serial-manipulator-type robots that are attached on the movable member and that have two or more degrees of freedom, the robots each comprising two or more end effectors provided at positions different from each other with one or more joints therebetween a gripping device that has a pair of gripping units provided on two different arms connected via one or more joints, and that sandwiches an object by the pair of gripping units a movable member provided in a machining chamber, the movable member being a tool spindle or a tool post that holds a tool which cuts and machines a workpiece

MACHINE TOOL

CROSS REFERENCE TO RELATED APPLICATION

The present invention claims priority under 35 U.S.C. § 119 to Japanese Patent Application No. 2016-098071 filed May 16, 2016, including the specification, claims, drawings, and abstract, is incorporated herein by reference in its entirety.

TECHNICAL FIELD

The present disclosure relates to a machine tool having one or more robots.

BACKGROUND

Recently, demands are increasing for automation and higher performances of machine tools. In order to realize automation, automatic changer apparatuses are proposed such as an automatic tool changer (ATC) which automatically changes tools, and an automatic palette changer (APC) which automatically changes a palette on which a workpiece is mounted. In addition, peripheral apparatuses such as a workpiece supply apparatus such as a loader and a bar feeder are also widely known. In order to realize higher performance, an in-machine measurement and an intelligent system using sensors are also employed.

Further, in order to automate or improve performance of machine tools, in some cases, use of a robot is proposed. For example, JP 2010-36285 A discloses a technique in which a robot provided outside of the machine tool is used, to execute attachment and detachment of the workpiece to and from the machine tool. JP 2010-64158 A discloses a technique in which an articulated robot which travels on a gantry rail attached on an upper part of the machine tool is provided, and the transport of the workpiece or the like among a plurality of machine tools is executed by the articulated robot. JP H5-301141 A and JP H5-301142 A disclose a transporting tool of a workpiece which transports the workpiece by an open/close operation of a grip unit. The transporting tool has an arm shape, and is attached to a body function box. The body function box is also provided at a right side of a spindle head which supports a spindle. The transporting tool can pivot about an axis approximately orthogonal to a long axis of the spindle. The transporting tool can change, by the pivoting movement, between a state in which the arm is approximately horizontal and a state in which the arm is approximately vertical.

With the technique of the related art, however, as a principle, one robot has only one end effector. Because of this, when two or more different works are desired to be done, for example, sensing and article gripping, a plurality of robots must be provided. However, when a plurality of robots are provided, other problems arise such as an increase in the cost and size of the machine tool.

An advantage of the present disclosure lies in the provision of a machine tool that can execute various works while suppressing increase in cost and size.

SUMMARY

According to one aspect of the present disclosure, there is provided a machine tool comprising: a movable member that can move with respect to a mounting surface of the machine tool; and one or more serial-manipulator-type robots that are attached on the movable member, that can move with the movable member, and that have two or more degrees of freedom, wherein the robot comprises two or more end effectors provided at positions different from each other with one or more joints therebetween.

A total of the number of degrees of freedom of the movable member and the number of degrees of freedom, in the robot, of at least one of the end effectors other than an end effector positioned at a tip-most side among the two or more end effectors may be greater than or equal to three.

One end effector may have at least one of a higher output torque and a heavier weight than an end effector positioned at a side closer to the tip than the one end effector.

At least one of the two or more end effectors may be a gripping device that has a pair of gripping units provided on two different arms connected via one or more joints, and that sandwiches an object by the pair of gripping units.

The movable member may be provided in a machining chamber, and may be movable in the machining chamber. In this case, the movable member may be a tool spindle or a tool post that holds a tool which cuts and machines a workpiece. At least one of the two or more end effectors may be able to access the workpiece or the tool during machining of the workpiece by the tool.

According to various aspects of the machine tool of the present disclosure, because the robot has two or more end effectors provided at positions different from each other with one or more joints therebetween, various works can be executed while suppressing increase in cost and size. In addition, because the robot is mounted on the movable member, even when the number of degrees of freedom of the end effector in the robot is low, a sufficient accessible range can be secured for the end effector.

BRIEF DESCRIPTION OF DRAWINGS

Embodiment(s) of the present disclosure will be described by reference to the following figures, wherein:

FIG. 6 is a schematic block diagram showing a structure of a machine tool.

DESCRIPTION OF EMBODIMENTS

Figure 1:
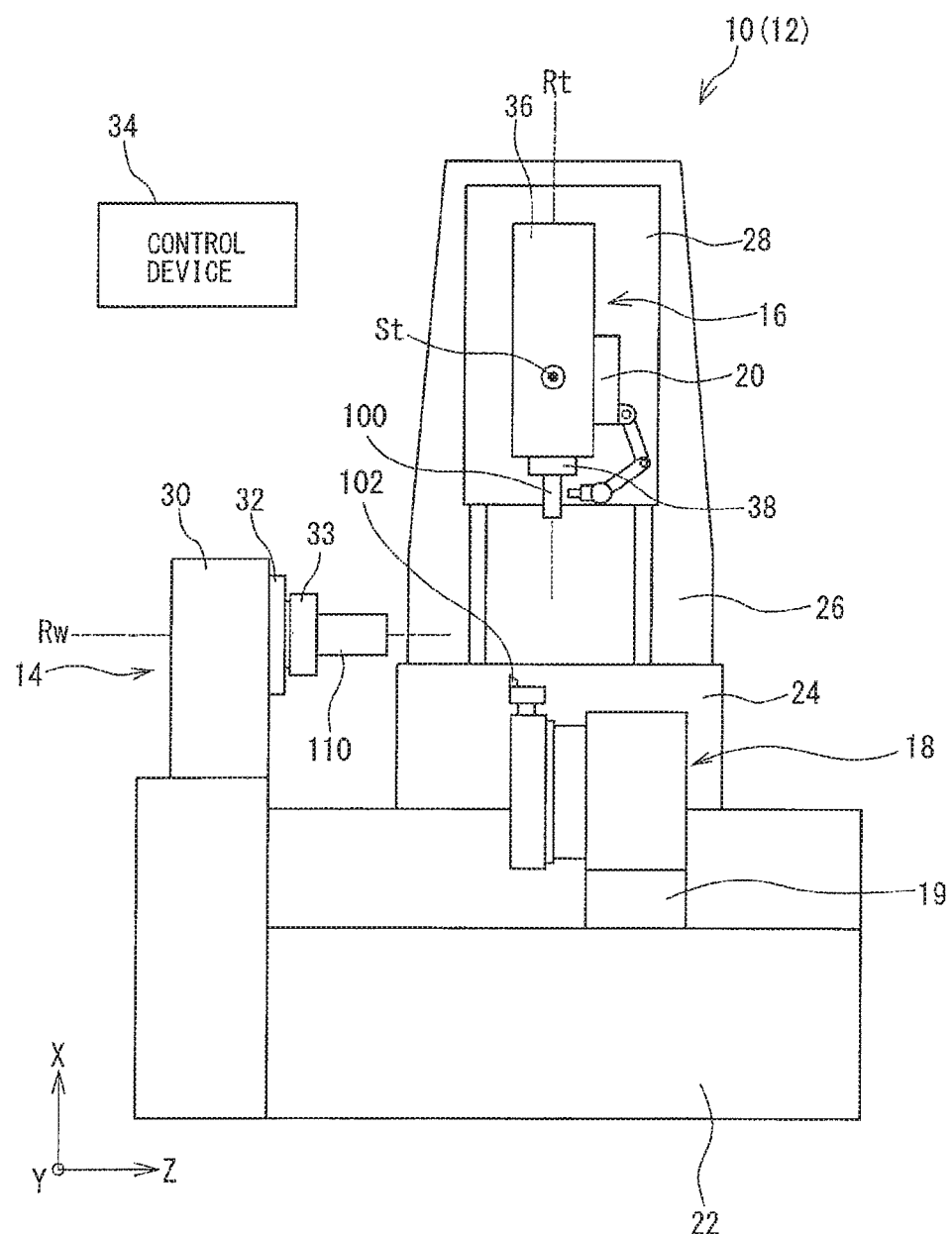
FIG. 1 is a diagram showing a structure of a machine tool.

A structure of a machine tool 10 will now be described with reference to the drawings. FIG. 1 is a diagram schematically showing a structure of the machine tool 10. In the following description, a rotational axis direction of a workpiece spindle 32 will be referred to as a Z-axis, a vertical direction orthogonal to the Z-axis will be referred to as an X-axis, and a direction orthogonal to the Z-axis and the X-axis will be referred to as a Y-axis. In addition, in the following description, the description "access" means that an end effector 46 moves close to the target, to a position where the objective of the operation of the end effector 46 can be achieved. Therefore, when the end effector 46 is a temperature sensor which contacts the target and detects the temperature thereof, the description "access" means that the end effector 46 moves close to the target, to a position where the end effector 46 contacts the target. When the end effector 46 is a temperature sensor which detects the temperature without contact, the description "access" means that the end effector 46 moves close to the target, to a position where the temperature of the target can be detected.

The machine tool 10 is a machine which cuts and machines a workpiece 110 by a tool. More specifically, the machine tool 10 is a multi-tasking machine having a lathe-turning function to cut the workpiece 110 by contacting a lathe-turning tool 102 while rotating the workpiece 110, and a rotation-cutting function to cut the workpiece 110 with a rotary tool 100. A periphery of a body 12 of the machine tool 10 is covered by a cover (not shown). A space defined by the cover is a machining chamber where machining of the workpiece 110 takes place. On the cover, at least one opening and a door which opens and closes the opening (both of which are not shown in the figure) are formed. An operator accesses the body 12 of the machine tool 10, the workpiece 110, or the like through the opening. During the machining, the door provided on the opening is closed. This is for sake of safety and the surrounding environment.

The body 12 comprises a workpiece spindle device 14 which holds the workpiece 110 in a manner allow self-rotation, a tool spindle device 16 which holds the rotary tool 100 in a manner to allow self-rotation, and a tool post 18 which holds the lathe-turning tool 102. The workpiece spindle device 14 comprises a spindle base 30 mounted on a base 22, and the workpiece spindle 32 attached to the spindle base 30. The workpiece spindle 32 includes a chuck 33 and a collet which hold the workpiece 110 in a detachable manner, and the workpiece 110 to be held can be arbitrarily exchanged. The workpiece spindle 32 also self-rotates with a workpiece rotational axis Rw which extends in the horizontal direction (Z-axis direction in FIG. 1) serving as a center.

The tool spindle device 16 functions as a movable member that can move with respect to a mounting surface of the machine tool. The tool spindle device 16 holds a tool for rotation-cutting (the rotary tool 100), for example, a tool called a fraise and an end mill, in a manner to allow self-rotation, and comprises a spindle head 36 having a drive motor or the like inside, and a tool spindle 38 attached on the spindle head 36. The tool spindle 38 comprises a clamper which holds the rotary tool 100 in a detachable manner, and the rotary tool 100 to be held may be exchanged as necessary. The tool spindle 38 also self-rotates with a tool rotational axis Rt which extends in the vertical direction (X-axis direction in FIG. 1) as a center.

On the spindle head 36, an in-machine robot 20 is attached. The in-machine robot 20 is used for supporting the machining process, various sensing processes, auxiliary works, or the like. A structure and a function of the in-machine robot 20 will be described later in detail.

Further, the spindle head 36 can swing around a swing axis St (refer to FIG. 2) which passes through the spindle head 36 and extends in the Y-axis direction. With the spindle head 36 swinging around the swing axis St, the orientations of the rotary tool 100 and the in-machine robot 20 are changed.

The spindle head 36 is attached on a middle base 28. The middle base 28 is attached on a column 26 via an X-axis guiderail (not shown), and can be moved upward and downward (can be moved in the X-axis direction) with respect to the column 26. The column 26 is attached on a saddle 24 via a Y-axis guiderail, and can be moved in the Y-axis direction with respect to the saddle 24. Further, the saddle 24 is attached on the base 22 via a Z-axis guiderail, and can be moved in the Z-axis direction with respect to the base 22. The saddle 24, the column 26, and the middle base 28 are suitably moved so that the tool spindle device 16, and consequently, the rotary tool 100 and the in-machine robot 20 attached to the tool spindle device 16, can be moved linearly to a desired position. As is clear from the above description, the tool spindle device 16 can translate in three axis directions and can also rotate around the swing axis St, and can be said to have four degrees of freedom.

The tool post 18 holds the lathe-turning tool 102 such as, for example, a tool called a "bite." The tool post 18 is attached to a lower saddle 19 via an X-axis guiderail, and can be moved upward and downward (can be moved in the X-axis direction) with respect to the lower saddle 19. The lower saddle 19 is attached to the base 22 via a Z-axis guiderail, and can be moved in the Z-axis direction. As a result, the lathe-turning tool 102 can be moved in the X-axis direction and in the Z-axis direction.

A control device 34 controls driving of various parts of the machine tool 10 in response to a command from an operator. The control device 34 is formed from, for example, a CPU which executes various calculations, and a memory which stores various control programs and control parameters. The control device 34 further has a communication function, and can exchange various data such as, for example, NC program data, with other devices. The control device 34 may include, for example, a numerical control device that calculates, when necessary, positions of the tools 100 and 102 and the workpiece 110. The control device 34 may be a single device or a combination of a plurality of calculator devices.

Figure 2:
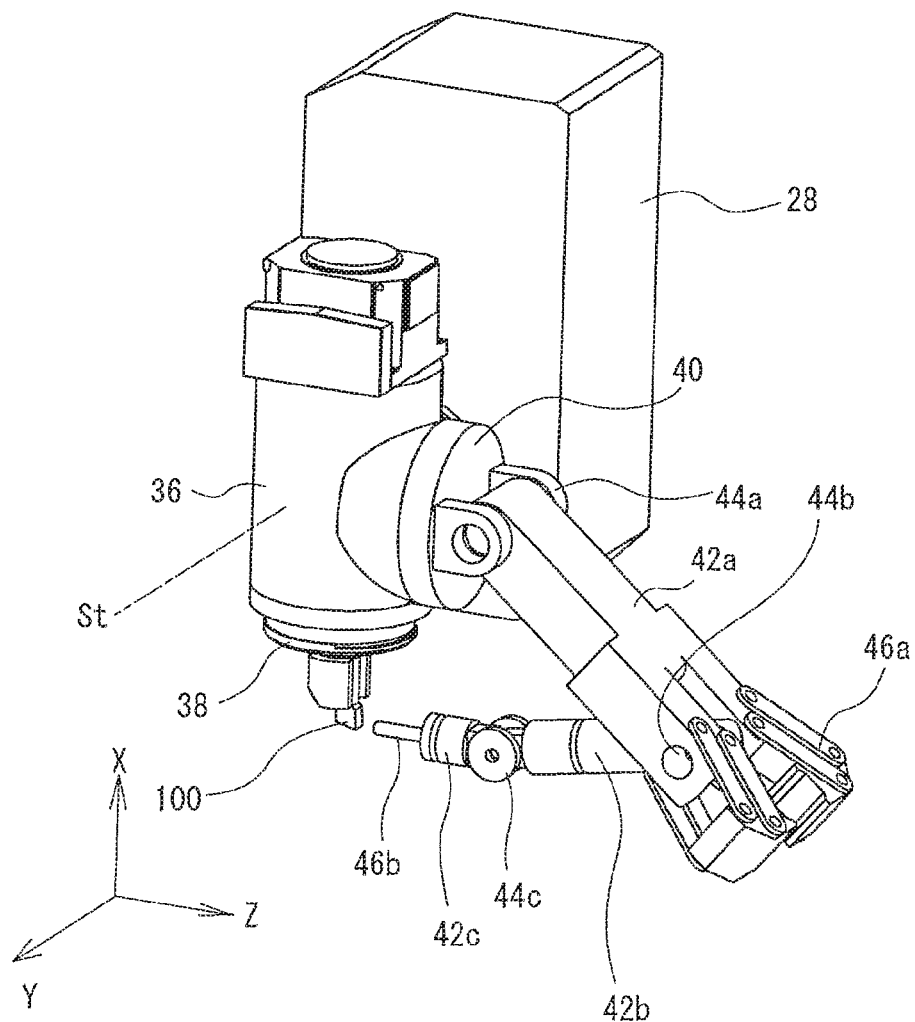
FIG. 2 is a perspective diagram of a periphery of an in-machine robot.
Figure 3:
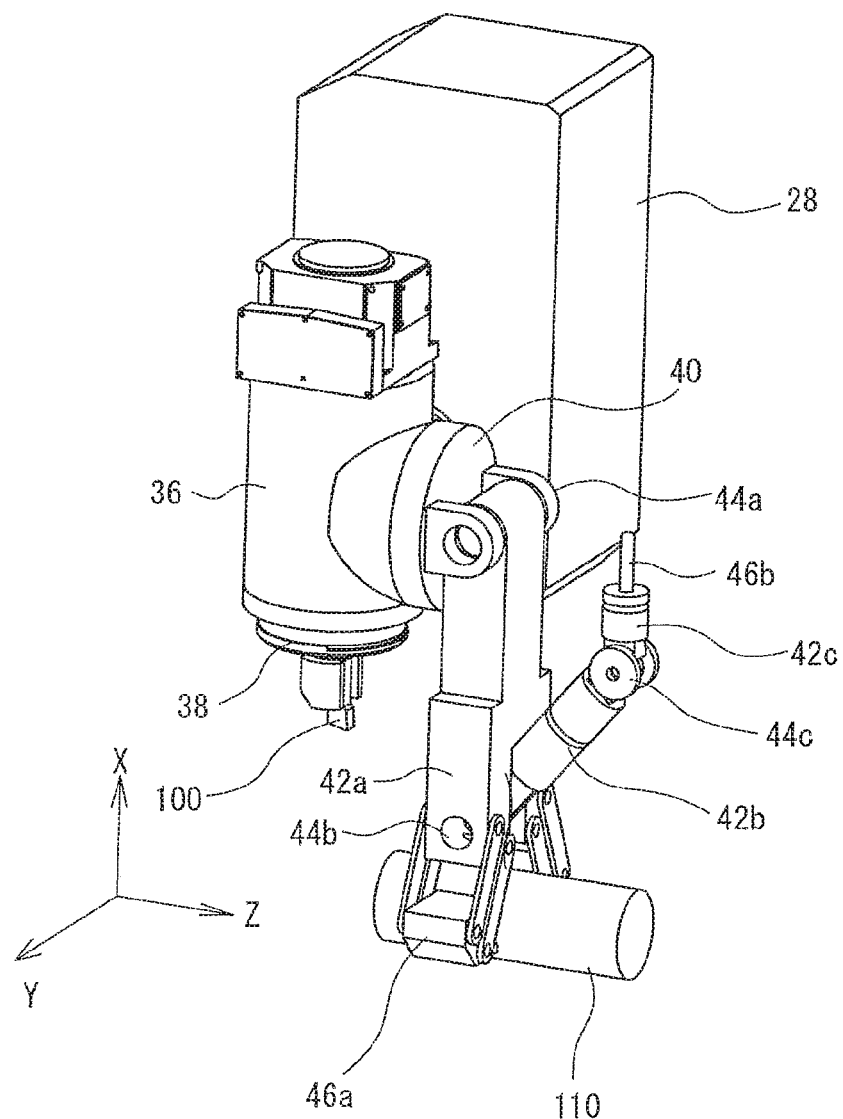
FIG. 3 is a perspective diagram of a periphery of an in-machine robot.

Next, the in-machine robot 20 attached to the tool spindle device 16 will be described with reference to FIGS. 2 and 3. FIGS. 2 and 3 are perspective diagrams of a periphery of the in-machine robot 20. As shown in FIG. 2, the in-machine robot 20 is an articulated robot having a plurality of arms 42a-42c and a plurality of joints 44a-44c. From another viewpoint, the in-machine robot 20 may be said to be a serial manipulator in which the plurality of arms 42a-42c and the plurality of joints 44a-44c are continuously connected. The in-machine robot 20 is attached to the spindle head 36 via a connecting mechanism 40. The spindle head 36 has an approximate circular tube shape, and has a center axis coinciding with the tool rotational axis Rt. As already described above, the spindle head 36 can translate in three axis directions and rotate around the swing axis St.

The in-machine robot 20 comprises first through third arms 42a-42c (hereinafter, when "first" through "third" are not to be distinguished, the letter in the reference numeral will be omitted, and the arms will be simply referred to as "arms 42"; the same convention is applicable to other constituting elements), first through third joints 44a-44c provided respectively at ends of the arms, and first and second end effectors 46a and 46b. A base end of the first arm 42a is connected to the connecting mechanism 40 via the first joint 44a, a base end of the second arm 42b is connected to a tip end of the first arm 42a via the second joint 44b, and a base end of the third arm 42c is connected to a tip end of the second arm 42b via the third joint 44c. Each of the first through third joints 44a-44c has a swing axis in the Y-axis direction (direction orthogonal to the tool rotational axis Rt), and each arm 42 swings around the swing axis as a center. Therefore, the in-machine robot 20 has three joints each permitting the rotation around one axis, and the in-machine robot 20 as a whole can be said to have three degrees of freedom.

An actuator such as a motor is attached to each of the first through third joints 44a-44c, and driving of the actuator is controlled by the control device 34. The control device 34 calculates positions of the first and second end effectors 46a and 46b to be described later, based on an amount of driving of the actuator provided on the joints 44a-44c.

The first end effector 46a is provided on a tip of the first arm 42a, and the second end effector 46b is provided on a tip of the third arm 42c. The first end effector 46a is a holding device which holds a target. The holding device may be a hand mechanism which sandwiches the target with a pair of gripping members which can contact or detach from each other, or may be a mechanism which holds the target using a magnetic force or a suctioning force. In FIG. 2, a holding device having a hand mechanism is shown as an example of the first end effector 46a.

The second end effector 46b is a sensor which senses information related to a target or a peripheral environment of the target. The target may be, for example, a rotation-cutting tool 100 held by the tool spindle device 16, the workpiece 110 held by the workpiece spindle device 14, and a lathe-turning tool 102 held by the tool post 18. The second end effector 46b is, for example, a contact sensor which detects presence/absence of contact with the target, a distance sensor which detects a distance to the target, a vibration sensor which detects vibration of the target, a pressure sensor which detects a pressure applied by the target, a sensor which detects a temperature of the target, or the like. A detection result of these sensors is stored and analyzed in correlation with positional information of the second end effector 46b calculated based on the amounts of driving of the joints 44a-44c. For example, when the second end effector 46b is a contact sensor, the control device 34 analyzes a position, a shape, and a movement of the target based on the timing of detection of the contact with the target and the positional information acquired at this timing.

The structure described herein is merely exemplary, and the position, structure, or the like of each end effector 46 may be changed, so long as two or more end effectors are provided at positions different from each other with one or more joints therebetween.

For example, the end effector 46 may be, in addition to the above-described sensor and holding device, a roller device which is pressed against the workpiece 110 and suppresses vibration of the workpiece 110. As an alternative configuration, the end effector 46 may be a device which discharges a fluid for supporting the machining process. Specifically, the end effector 46 may be a device which discharges air for blowing swarf, or a cooling fluid (cutting oil, cutting water, or the like) for cooling the tools 100 and 102 or the workpiece 110. Alternatively, the end effector 46 may be a device which discharges energy or a material for forming a workpiece. Therefore, for example, the end effector 46 may be a device which discharges laser or arc, or a device which discharges a material for layering and forming. Further, as an alternative configuration, the end effector 46 may be a camera which captures an image of the target No particular limitation is imposed on the target on which the end effector 46 acts, so long as the target is located within the machining chamber. Therefore, the target may be the rotary tool 100 held on the tool spindle 38, or the workpiece 110 held on the workpiece spindle device 14. Moreover, the target may be the lathe-turning tool 102 held on the tool post 18. In addition, the target may be a target other than the tools 100 and 102 and the workpiece 110, and may be, for example, the swarf spread in the machining chamber, a component assembled to the workpiece 110, or a constituting component of the machine tool 10 (such as the chuck 33 of the workpiece spindle 32, a collet of the tool spindle 38, or the like).

Here, desirably, at least one of the plurality of end effectors 46 is accessible to the workpiece 110 or the tools 100 and 102 during machining of the workpiece 110 by the tools 100 and 102. As will be described later, with such a configuration, the in-machine robot 20 can execute a support of machining of the workpiece 110 by the tools 100 and 102, and sensing related to the tools 100 and 102 or the workpiece 110 during the machining.

No limitation is imposed on the number of the end effectors equipped on one in-machine robot 20 so long as the number is two or greater, and the number may be three or four. In addition, the two or more end effectors may all be of different types from each other, or may be of the same type for a part of or all of the end effectors. Therefore, for example, both the first end effector 46a provided on the tip end of the first arm 42a and the second end effector 46b provided on the tip end of the third arm 42c may be holding devices (or sensors). Alternatively, in addition to the first and second end effectors 46a and 46b, an end effector may be provided on the second arm 42b. In the present disclosure, the robot is a three-joint, three-arm robot, but alternatively, four or more joints and arms may be provided, and four or more end effectors 46 may be provided.

Figure 4:
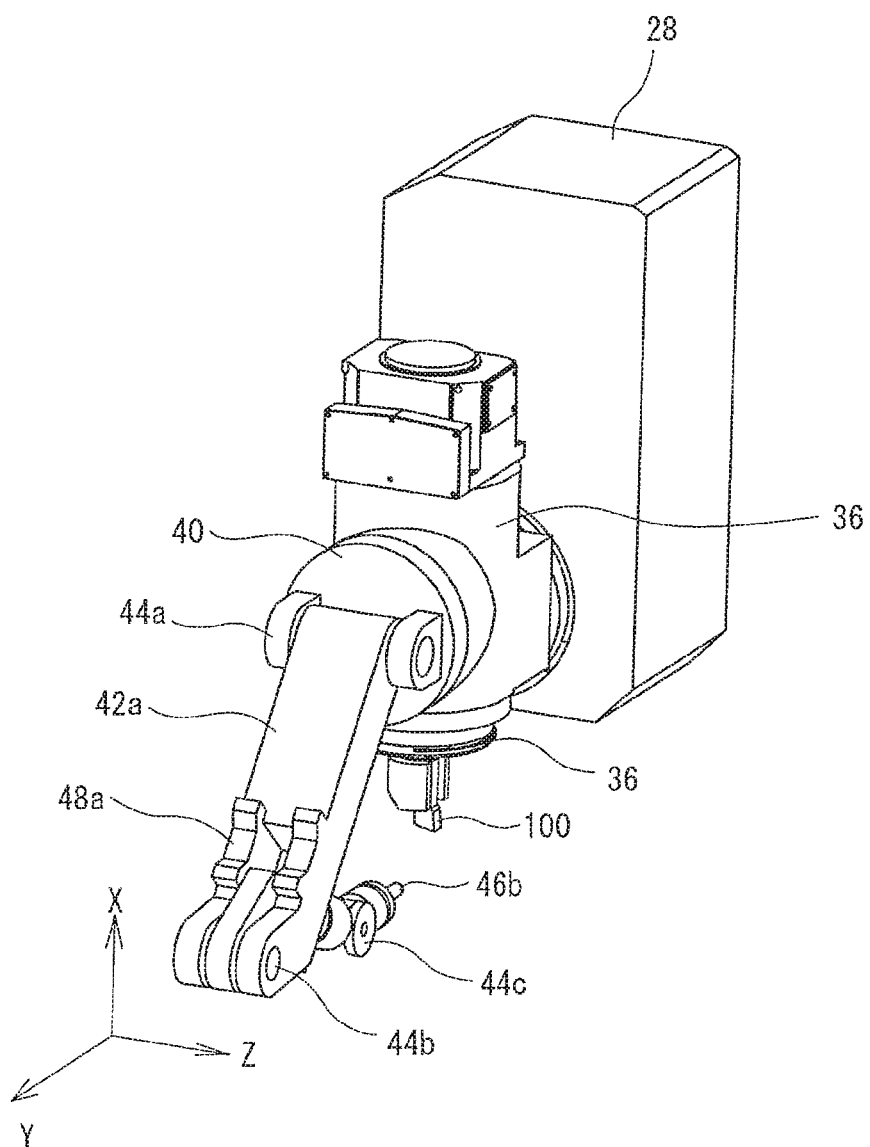
FIG. 4 is a perspective diagram of a periphery of another in-machine robot.
Figure 5:
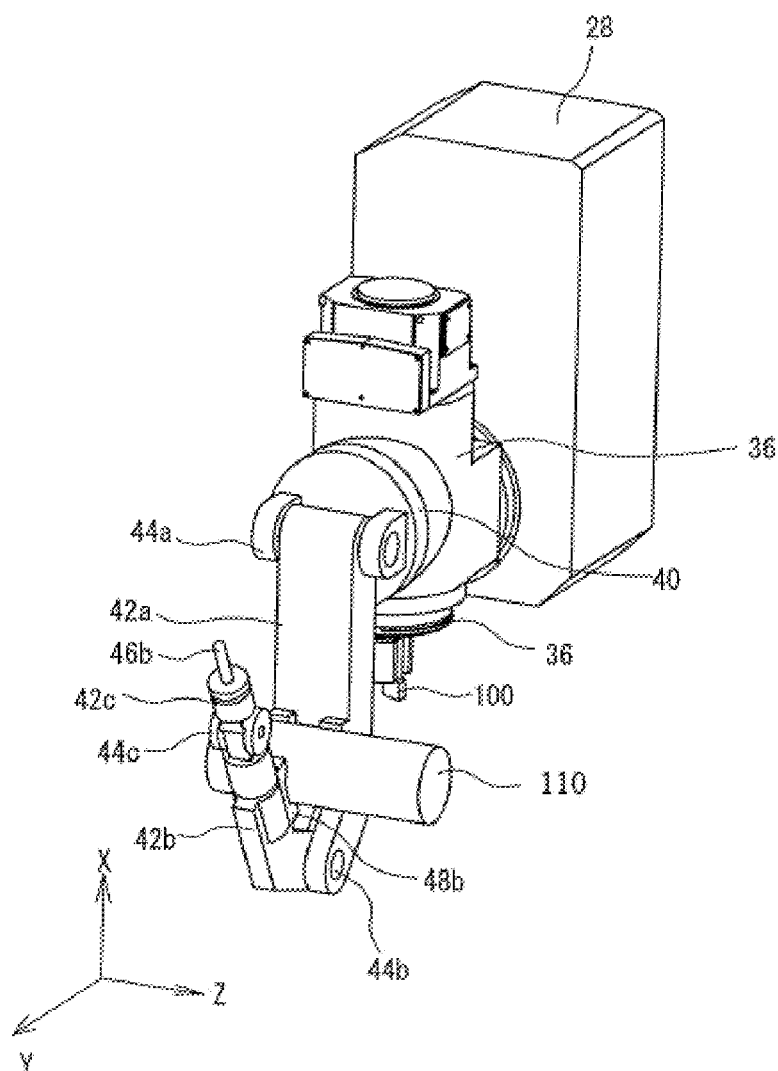
FIG. 5 is a perspective diagram of a periphery of another in-machine robot.

Alternatively, one end effector 46 may be provided over two or more arms 42. For example, as shown in FIGS. 4 and 5, the end effector 46 may be a gripping device that sandwiches an object (in the configuration shown in the figure, the workpiece 110) by a first gripping unit 48a provided on the first arm 42a and a second gripping unit 48b provided on the second arm. In this case, two arms 42 on which the first and second gripping units 48a and 48b are provided do not need to be adjacent to each other, so long as the two arms 42 are connected via one or more joints.

In either case, by providing two or more end effectors 46 on one in-machine robot 20, it becomes possible to execute various works while suppressing the increase in cost and size. When two or more end effectors 46 are provided on one in-machine robot 20, a part of the end effectors would be placed near a base end. In the region near the base end of the in-machine robot 20, the degree of freedom is inevitably low. For example, the first end effector 46a is attached to the first arm 42a, and has a low degree of freedom in the in-machine robot 20. In this case, there is a possibility that the accessible range for the first end effector 46a is narrowed. However, in the machine tool described herein, the in-machine robot 20 is provided on the tool spindle device 16, which is a movable member. Because of this, the numbers of degrees of freedom of the first end effector 46a would be a value in which the number of degrees of freedom (one) of the first end effector 46a in the in-machine robot 20 and the number of degrees of freedom (four) of the tool spindle device 16 are added, or a total of five degrees of freedom. In other words, because the in-machine robot 20 is attached to the movable member, even if a part of the end effectors 46 is placed near the base end, the number of degrees of freedom can be held high, and the accessible range can be maintained wide. In order to maintain a sufficient degree of freedom, it is desirable that a total of the number of degrees of freedom, in the robot, of at least one of the end effectors other than the end effector positioned at the tip-most side among the plurality of end effectors 46 and the number of degrees of freedom of the movable member is 3 or more.

Further, no particular limitation is imposed on the movable member on which the in-machine robot 20 is attached, so long as the movable member is a movable member which can move with respect to a mounting surface of the machine tool. However, in consideration that various works are to be executed in the machining chamber, the movable member on which the in-machine robot 20 is attached is desirably a movable member which is provided in the machining chamber and which can move within the machining chamber. Examples of the movable member include, for example, an automatic tool changer, an automatic palette changer, a tool spindle device provided on a milling machine or a machining center, a tool post, or an opposing spindle base provided in a lathe. In addition, when the machine tool is, for example, a laser machine or an electric discharge machine, the in-machine robot 20 may be attached to a laser head of the laser machine or a discharge head of the electric discharge machine. Further, when the machine tool is a layering and forming device which layers and forms a shape by radiating a material, the in-machine robot 20 may be attached on an irradiation head that radiates the material, and, when the machine tool is a mold machine such as a press machine and a forging machine, the in-machine robot 20 may be attached to a machining head which holds a press die or the like in a movable manner.

In order for the in-machine robot 20 to execute the support of the machining of the workpiece 110 by the tools 100 and 102, and sensing related to the tools 100 and 102 or the workpiece 110 during the machining, the in-machine robot 20 is desirably attached to the tool spindle device 16 or the tool post 18. The tool spindle device 16 and the tool post 18 are formed to be able to move close to the tools 100 and 102 and the workpiece 110. Thus, by providing the in-machine robot 20 on the tool spindle device 16, it becomes possible for the end effector 46 to access the tools 100 and 102 or the workpiece 110, and to execute the support of machining or the sensing process.

As is clear from the description above, in the machine tool described herein, the first end effector 46a is provided on the first arm 42a and the second end effector 46b is provided on the third arm 42c. Such a placement is employed because the first end effector 46a has a higher output torque and a heavier weight than the second end effector 46b. In other words, normally, an end effector 46 having a higher output torque tends to have a larger size, and a larger weight driving mechanism, and a reaction force received from the target during the driving is also larger. Because of this, the end effector 46 having a larger output torque and/or a heavier weight is desirably stably held by a member having as high a rigidity as possible. When the in-machine robot 20 is provided closer to the base end side, the arm can be made thicker to increase the rigidity, and can be stabilized because the moment is smaller. By placing the first end effector 46a having a higher output torque and a heavier weight at a position near the base end having such a characteristic, a larger force can be output. Meanwhile, the second end effector 46b is a sensor, the output torque thereof is zero, and the weight is low. Thus, there is no problem when the second end effector 46b is provided at the tip of the in-machine robot 20. When the plurality of end effectors 46 are to be provided in a manner similar to that of the present embodiment, it is desirable that one end effector has at least one of a higher output torque and a heavier weight than another end effector positioned at a position closer to the tip side than the one end effector.

Next, an example operation of the in-machine robot 20 described above will be described. As shown in FIG. 1, the in-machine robot 20 exemplified in FIGS. 1 and 2 can sense a state (for example, a shape) of the rotary tool 100 with the second end effector 46b which is a sensor. Further, as shown in FIG. 2, the in-machine robot 20 can hold and transport the workpiece 110 by the first end effector 46a which is a holding device.

The in-machine robot 20 may be used for various purposes by changing the type of the end effector 46 to be equipped. For example, the in-machine robot 20 may help the machining while the workpiece 110 is machined. Specifically, for example, the in-machine robot 20 supports at least one of the workpiece 110 and the tools 100 and 102 during machining. With such a configuration, vibration or the like of the workpiece 110/tools 100 and 102 having a low rigidity can be suppressed. When the workpiece 110/tool 100 which is rotationally held is to be supported, a roller or the like is desirably provided on the end effector 46 in order to not block the rotation.

As an alternative configuration, the in-machine robot 20 may hold the workpiece 110 in place of the workpiece spindle device 14 during the machining. With such a configuration, it becomes possible to freely change the orientation of the workpiece 110 during machining, which in turn allows for machining of a complex shape. Further, as an alternative configuration, the in-machine robot 20 may apply vibration to the workpiece 110 and the tools 100 and 102 during the machining. With such a configuration, a special machining process can be enabled in which the workpiece is cut while vibration is applied. As a further alternative configuration, the in-machine robot 20 may discharge cooling fluid (cutting oil, cutting water) or air for removing swarf during the machining. By discharging the cooling fluid or the air by the in-machine robot 20 whose position and orientation can be freely changed, it becomes possible to more freely control the cutting characteristic and the temperature of the workpiece 110 and the tools 100 and 102.

Alternatively, the in-machine robot 20 may execute various sensing processes, for example, during the machining of the workpiece 110, or before or after the machining. Specifically, for example, the in-machine robot 20 may monitor a cutting state (precision of machined surface and state of swarf). As an alternative configuration, the in-machine robot 20 may sense the states of the workpiece 110 and the tools 100 and 102, for example, the temperature, the vibration, the distortion, or the like during the machining, and output the sensed result to the control device 34. In this case, the control device 34 desirably changes various machining conditions (feed rate, rotational rate, or the like) as necessary, based on the information detected by the in-machine robot 20. Alternatively, the in-machine robot 20 may have a structure in which the shape of the workpiece 110 is measured before start of the machining or after completion of the machining. By measuring the shape of the workpiece 110 before the start of the machining, it is possible to reliably prevent error in the attachment of the workpiece 110. By measuring the shape of the workpiece 110 after the completion of the machining, it is possible to judge quality of the machining result. As an alternative configuration, for example, the in-machine robot 20 may measure the states of the tools 100 and 102 (amount of wear, amount of protrusion, or the like) before the start of the machining or after the completion of the machining.

Further, the in-machine robot 20 may execute a work not directly related to the machining. Specifically, the in-machine robot 20 may execute a cleaning work for collecting the swarf which is spread in the machining chamber during the machining or after the completion of the machining. As an alternative configuration, the in-machine robot 20 may inspect the tool (checking presence/absence of wear and an amount of protrusion) or inspect movable parts of the machine tool 10 during a period in which the machining is not executed.

Further, the in-machine robot 20 may execute the work which has been executed by an out-of-machine robot in the related art, during the machining or after the completion of the machining. For example, the in-machine robot 20 may execute additional machining (such as removal machining such as trimming and die polishing, surface reformation, adding machining, or the like) on the workpiece 110. In addition, the in-machine robot 20 may transport, exchange, or arrange the workpiece 110 and the tools 100 and 102. Further, the in-machine robot 20 may examine or assemble various components.

As described above, the in-machine robot 20 may be used for various purposes. The type of the end effector 46 provided on the in-machine robot 20 may be selected according to the purpose desired for the in-machine robot 20.

When such an in-machine robot 20 is used, it is desired that at least one of the plurality of end effectors 46 can access at least the workpiece 110 and the rotary tool 100 used for the machining, and it is more desirable that the end effector 46 can access a large portion in the machining chamber. Moreover, when the machine tool is a multi-tasking machine having the rotational cutting function and the lathe-turning function, it is desirable that the in-machine robot 20 can also access the lathe-turning tool 102. In order to widen the access range of the in-machine robot 20, if the movable range of the in-machine robot 20 itself (that is, the movable range of the end effector 46 with respect to the connecting mechanism 40) is to be widened, a moving mechanism of the in-machine robot 20 becomes large. As a result, the size of the in-machine robot 20 would be increased, possibly causing a problem such as interference with other members. In addition, with the increase in the size of the in-machine robot 20, a size of the actuator such as the motor for driving the in-machine robot 20 is also increased, resulting in a problem that weight and cost of the in-machine robot 20 as a whole are also increased.

As described above, the in-machine robot 20 is attached to the tool spindle device 16. As is known, the tool spindle device 16 holds the rotary tool 100 for machining the workpiece 110. Normally, in order to realize the machining of the workpiece 110 by the rotary tool 100, the tool spindle device 16 can be moved relatively with respect to the workpiece spindle device 14, in order to allow the rotary tool 100 to suitably access the workpiece 110. Therefore, by attaching the in-machine robot 20 to the tool spindle device 16, it becomes possible to position the in-machine robot 20 near the rotary tool 100 and the workpiece 110 even if the movable range of the in-machine robot 20 itself is narrow. As a result, it becomes possible to enable even an in-machine robot 20 having a relatively small size and a small movable range to reliably access the rotary tool 100 and the workpiece 110 during machining. In addition, by attaching the in-machine robot 20 on the tool spindle device 16, even when the movable range of the in-machine robot 20 itself is narrow, the movable range of the in-machine robot 20 with respect to the workpiece 110 can be increased.

Moreover, the tool spindle device 16 can linearly move in the X-axis, Y-axis, and Z-axis directions, and can also swing around the axis in the Y-axis direction. By attaching the in-machine robot 20 on the tool spindle device 16 which can move in the machining chamber in this manner, it becomes possible to enable the in-machine robot 20 to access not only the workpiece 110 and the tools 100 and 102, but also a wide range within the machining chamber. As a result, it becomes possible to execute various works with the in-machine robot 20 such as cleaning of the machining chamber, transporting the workpiece 110 into and out of the machining chamber, or the like. Further, by providing the device for inspection and cleaning of the in-machine robot 20 at a position which does not block the machining such as at an end of the machining chamber, it becomes possible to move the tool spindle device 16 together with the in-machine robot 20 as necessary, to inspect and clean the in-machine robot 20.

The structure of the in-machine robot 20 described above is merely exemplary. No particular limitation is imposed on the structure of the in-machine robot 20 so long as the in-machine robot 20 has two or more end effectors. Therefore, the number, the direction of swing, or the like of the joints 44 and the arms 42 of the in-machine robot 20 may be suitably changed.

In the above description, a multi-tasking machine having the tool spindle device 16 which holds the rotary tool 100 is exemplified. Alternatively, the present technique may be applied to other machine tools. The in-machine robot described herein may be equipped on a machining center or a milling machine which does not have the tool post or the workpiece spindle device. As an alternative configuration, the in-machine robot described herein may be provided on a machine tool which radiates energy or a material in a predefined irradiation axis direction, to form a workpiece. As the machine tool which radiates energy, for example, a waterjet machine, a laser machine, an electric discharge machine, or the like may be exemplified. As the machine tool which radiates a material, a layer former such as a 3D printer may be exemplified. In these machine tools, an irradiation head which radiates the energy or the material to the predefined irradiation axis direction is provided. In this case, the in-machine robot is desirably attached on the irradiation head. In addition, the number of in-machine robots attached on the tool spindle device and the irradiation head is not limited to one, and may be a plurality.

The invention claimed is:
1. A machine tool comprising:
   a movable member; and
   a robot attached to the movable member, the robot comprising:
      a plurality of arms;
      two or more end effectors provided at positions different from each other; and
      a joint provided between two end effectors of the two or more end effectors;
   wherein
   the movable member holds a tool which cuts and machines a workpiece,
   the robot has two or more degrees of freedom,
   the robot is attached to the movable member such that translational movement of the movable member causes translational movement of the robot;
   the robot is attached to the movable member such that the robot can stay in a fixed position relative to the movable member during movement of the movable member;
   the robot is attached to the movable member such that movement of the arms of the robot does not cause the movable member to move, and
   one of the two end effectors is a gripping device comprising a pair of gripping units, wherein a first gripping unit of the pair of gripping units is provided on a first arm of the plurality of arms and a second gripping unit of the pair of gripping units is provided on a second arm of the plurality of arms, and the first gripping unit and the second gripping unit being structured to sandwich the workpiece.

2. The machine tool according to claim 1, wherein a total of the number of degrees of freedom of the movable member and a number of degrees of freedom, in the robot, of at least one of the two or more end effectors other than an end effector positioned at a tip-most side of the robot is greater than or equal to three.

3. The machine tool according to claim 1, wherein a first end effector of the two end effectors has at least one of a higher output torque and a heavier weight than a second end effector of the two end effectors positioned closer to a tip of the robot than the first end effector is to the tip of the robot.

4. The machine tool according to claim 1, wherein the movable member is provided in a machining chamber, and can move in the machining chamber.

5. The machine tool according to claim 1, wherein one of the two end effectors can access the workpiece or the tool during machining of the workpiece by the tool.

* * * * *